INVENTOR.
WILLIAM S. TUFTS

INVENTOR
WILLIAM S. TUFTS
ATTORNEY

3,414,860
DEFROSTER CONTROL APPARATUS COMPRISING A TIMER SWITCH AND TEMPERATURE SENSING ELEMENT
William S. Tufts, Gahanna, Ohio, assignor to Ranco Incorporated, Columbus, Ohio, a corporation of Ohio
Filed Mar. 7, 1966, Ser. No. 532,439
14 Claims. (Cl. 337—302)

ABSTRACT OF THE DISCLOSURE

A defroster control for refrigeration equipment comprising a spring leaf contact member normally biased in one direction to close a first circuit and movable in the opposite direction to a second defrost cycle initiating position by an actuating arm mechanically connected and disconnected with the contact member by a latching mechanism which is operative to establish either of two spaced positions of the arm and contact member. The arm is moved to actuate the contact member, when latched to the latter, by a timer cam, the latch adapted to be actuated to effect a step movement of the contact member from the second circuit controlling position and the actuating arm to a position intermediate the first and second circuit controlling position and then upon a second actuation of the latch to the first circuit controlling position. The latch mechanism is actuated first by a temperature response element in response to a defrost temperature and is actuated secondly by a timer so that a delay in closing the first circuit occurs after a defrosting cycle in the refrigeration equipment.

---

The present invention relates to control apparatus particularly adapted for effecting automatic defrosting of refrigerating systems.

The principal object of the present invention is the provision of a control apparatus for automatically initiating a defrosting cycle in a refrigerating system and providing a time delay period between termination of the defrosting cycle and resumption of normal refrigeration cycles.

More particularly, it is the object of the invention to provide electrical switching mechanism for controlling the operation of electrically powered refrigeration equipment which comprises a switching arm movable between two contact making positions and including time and temperature mechanism for shifting the contact arm from one position to the other to initiate a defrost cycle and to return the contact arm to its initial contacting position but only after arresting its movement intermediate the contacting positions.

Other objects and advantages of the invention will be apparent from the following description of preferred forms thereof, reference being made to the accompanying drawings wherein.

Figure 2:
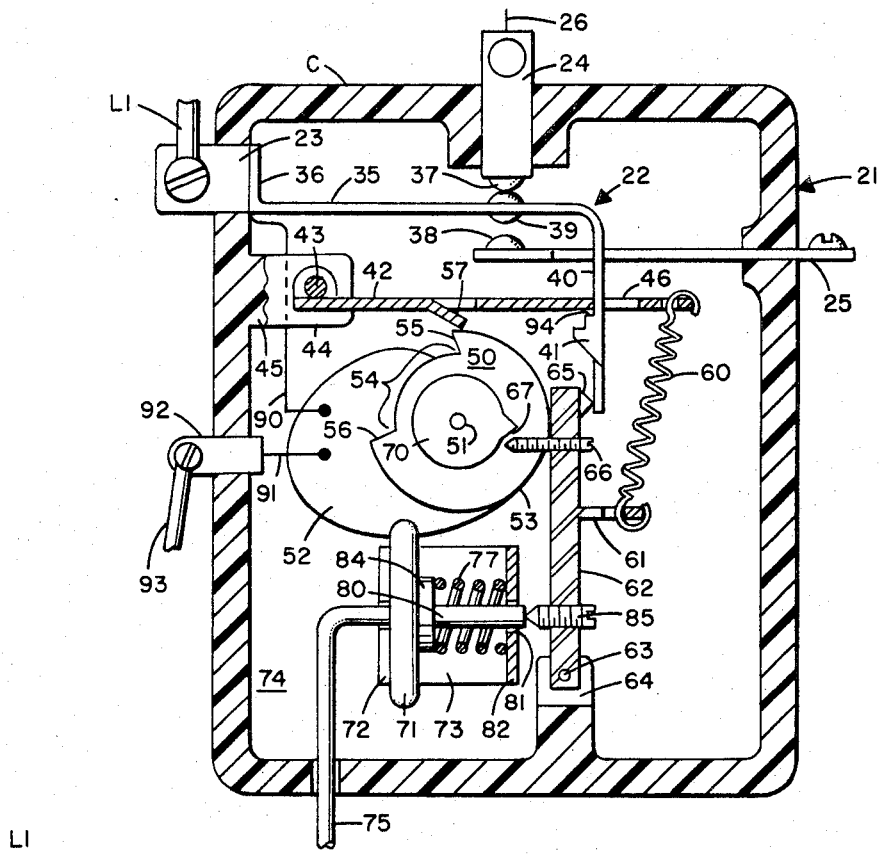
FIG. 2 is a more or less schematic showing of a control apparatus embodying the invention for controlling defrosting of the refrigeration system shown in FIG. 1.

Although the invention may be used in many different forms of refrigerating systems, one embodiment is shown in a refrigerating system 10 which, in general, is a conventional compressor-condenser-expander type comprising an electrically motor driven compressor 11 having its discharge connected by tubing 12 to a conventional condenser 13, and the outlet of the condenser is connected by tube 14 to an expansion device 15 at the inlet of an evaporator 16. The outlet of evaporator 16 is connected by a tube 17 to the intake or suction side of the compressor 11. Although not shown, the evaporator may be located in a suitable housing for circulating air over the evaporator to chill the same after which the air is returned into a compartment to be refrigerated.

Figure 1:
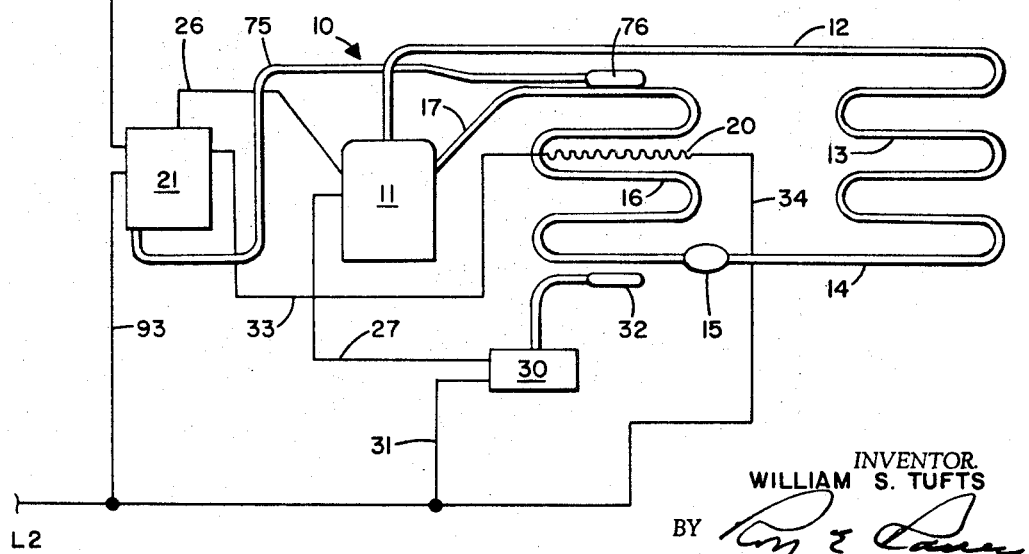
FIG. 1 is a schematic showing of a refrigerating system embodying the invention.
Figure 3:
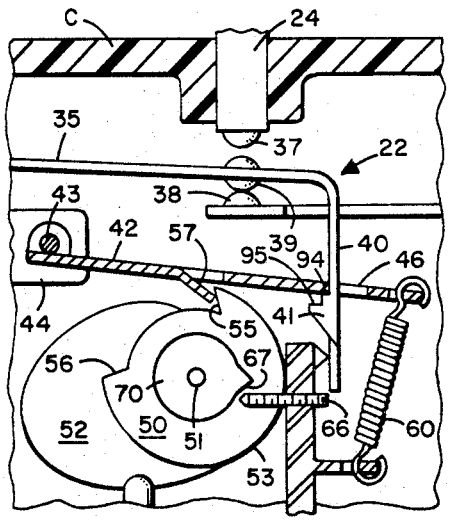
FIGS. 3 and 4 are fragmentary views of the control apparatus similar to FIG. 2 and showing certain parts in different positions.
Figure 5:
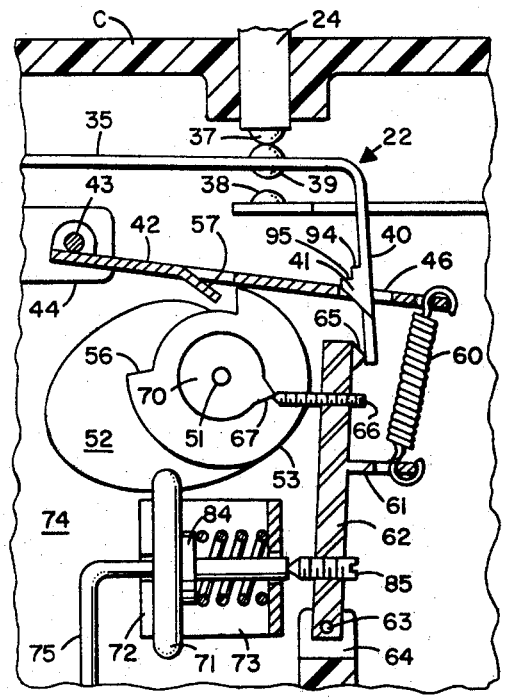
FIG. 5 is a view similar to FIG. 2 but showing the parts in still a different position.

In the system shown in FIG. 1, the evaporator is periodically heated to defrost the same by an electric heating unit 20 which is suitably disposed in heat exchange relation with the evaporator, and inasmuch as this practice is well known it is not shown in detail. In defrosting the evaporator, the compressor 11 is stopped and the heating element 20 is energized until the temperature of the evaporator reaches a degree indicative of complete removal of frost therefrom upon which event the energization of the heater is terminated and after a period to permit equalization of pressures throughout the refrigerating system, the compressor is again operated to produce normal refrigeration temperatures in the evaporator.

The control for the compressor motor 11 and the heating element 20 is effected by an electric switching mechanism 21 which includes an electric switch 22. The switch 22 is located in a suitable casing C and comprises terminals 23, 24, 25. A line L1 of a suitable electric power source such as a 120 v. AC system, is connected to terminal 23, and terminal 24 is connected with one side of the motor of the compressor 11 by a line 26 so that the switch 22 is in series with the compressor motor. The opposite side of the compressor motor is connected by a line 27 to one side of a thermostatic control switch 30, the opposite side of which switch is connected by a wire 31 to the other line L2 of the power source. The thermostat 30 is a conventional type including a temperature sensing bulb 32 located to respond to the temperatures adjacent the evaporator 16 and is effective to open and close the compressor motor circuit to cause a production of below freezing temperatures in the evaporator. Any suitable arrangement could be provided for automatically controlling operation of the compressor 11, as is well known in the art.

Terminal 25 of switch 22 is connected by wire 33 to one side of the heater 20, and the other side of the heater is connected by wire 34 to line L2 of the power source.

As is described more fully hereinafter, switch 22 is normally operative to maintain one side of the compressor 11 connected with line L1 and heater 20 disconnected from L1. Periodically, however, the circuit for compressor 11 is opened by the switch and the heater circuit is closed until the evaporator reaches a given temperature above 32° F. at which time the heater circuit is opened by the switch 22. After an interval the motor circuit is re-established through the switch 22.

Referring more particularly to the construction of control apparatus 21, the apparatus includes the casing C, which may be of molded plastic, for example, which encloses and supports the switching mechanism 22 and switch actuating devices. The switch mechanism 22 comprises a flat spring arm 35 which includes a foot portion 36 attached to the terminal 23, which is suitably embedded in a side wall of the casing and supports the main portion of the arm 35 in cantilever fashion so that the unsecured portion thereof extends between two fixed contacts 37, 38 and which carries a double contact 39 thereon adapted to alternatively engage the two fixed contacts. The arm 35 is inherently biased to engage contact 39 on contact 37.

The contact 37 is attached to the terminal 24, which is secured in an opening through the top wall of the casing C, and the contact 38 is attached to the terminal 25 which is rigidly supported in a side wall of the casing C. The right hand end portion 40 of the contact arm 35 is turned downwardly, as seen in FIG. 2, and has a latch member 41 formed thereon.

An operating arm 42 is pivotally attached at one end to a wall of the casing C by a pivot pin 43 which is supported in two spaced lugs 44, 45 formed on the casing side wall and the operating arm has an opening 46 through which the portion 40 of contact arm 35 projects. The opening 46 is of such dimension as to permit passage of the latch member 41 therethrough and the inherent resiliency of the contact arm 35 urges the portion 40 to the left.

The operating arm 42 is movable counterclockwise about pivot pin 43 by a cam 50 which is driven clockwise at a rate, such as three revolutions per hour, by a drive shaft 51 of an electric motor driven timer 52 to which the cam is attached. The timer 52, which may be of conventional construction, is secured in the casing. The periphery of cam 50 includes an extensive arcuate portion 53 of a fixed diameter and a sector 54 of substantially reduced diameter with the edge portions 55 and 56 between the sectors 53, 54 forming abrupt steps, particularly the edge 55 which is slightly undercut. The operating arm 42 includes a tongue portion 57 which is adapted to ride the periphery of the cam 50.

The operating arm 42 is continually biased downwardly to engage the tongue 57 on the cam 50 by a tension spring 60, one end of which is attached to the outer end of arm 42 by inserting the hooked end thereof in an eye formed in the control arm and the opposite end of which is similarly attached to lug 61 formed on a control lever 62. The tension of spring 60 is such as to overcome the inherent bias of contact arm 35 upwardly to close contact 39 on contact 38 when the operating arm 42 is connected with the contact arm as described hereinafter.

The lever 62 is pivoted at its lower end on a pin 63, which is supported between two parallel lugs 64 formed on the casing C but only one of which appears in the drawings and the upper end has a cone shaped projection 65 the point of which is adapted to engage the depending portion 40 of contact arm 35. A screw 66 is threaded through an opening in the control lever 62 and its left hand end is adapted to be engaged by a rise 67 formed on a second cam 70 attached to the timer drive shaft 51 and which rotates with the cam 50 whereby the cam 70 may periodically shift the control lever 62 to the right a predetermined distance as is described more fully hereinafter.

The control lever 62 is adapted to be shifted clockwise about its pivot 63 by a thermally responsive element 71, which element is supported or backed up by a leg 72 of a U-shaped bracket 73 attached to the rear wall 74 of the casing C, as viewed in FIG. 2. The power element 71 is of a well known type and comprises an expansible wafer containing a suitable fluid which expands and contracts according to changes in temperature and which fluid is contained in the wafer and a capillary tube 75 connected with the interior of the wafer. The tube 75 includes a bulb 76 at its outer extremity which bulb is located in close thermal exchange contact with the evaporator 16 at a position which rises above the freezing temperature of water when the evaporator is completely cleared of frost by operation of the heater 20. The expansion of the element 71 is counteracted by a compression spring 77 which surrounds a post 80 attached to the movable wall of the element and which extends through an opening 81 through a side 82 of the bracket 73. The spring 77 is compressed between the side 82 of the bracket and the base 84 of the post 80. The outer end of the post 80 engages a screw 85 which is threaded through an opening through the lever 62. It will be seen that by adjusting the longitudinal position of the screw 85 in the lever 62, the degree of expansion of the element 71 required to shift the lever 62 to a given angular position can be regulated.

The cricuit for energizing the electric motor of the timer 52 includes a wire 90 connected between terminal 23 and one side of the motor, a wire 91 attached to a terminal 92 extending through an opening in the wall of the casing C and a wire 93 connected between terminal 92 and line L2. It will be seen that the motor 52 will operate at all times during operation of the refrigeration system, and during normal operation the parts of the control apparatus are as shown in FIG. 2 in which contact arm 35 is in engagement with contact 36.

Figure 4:
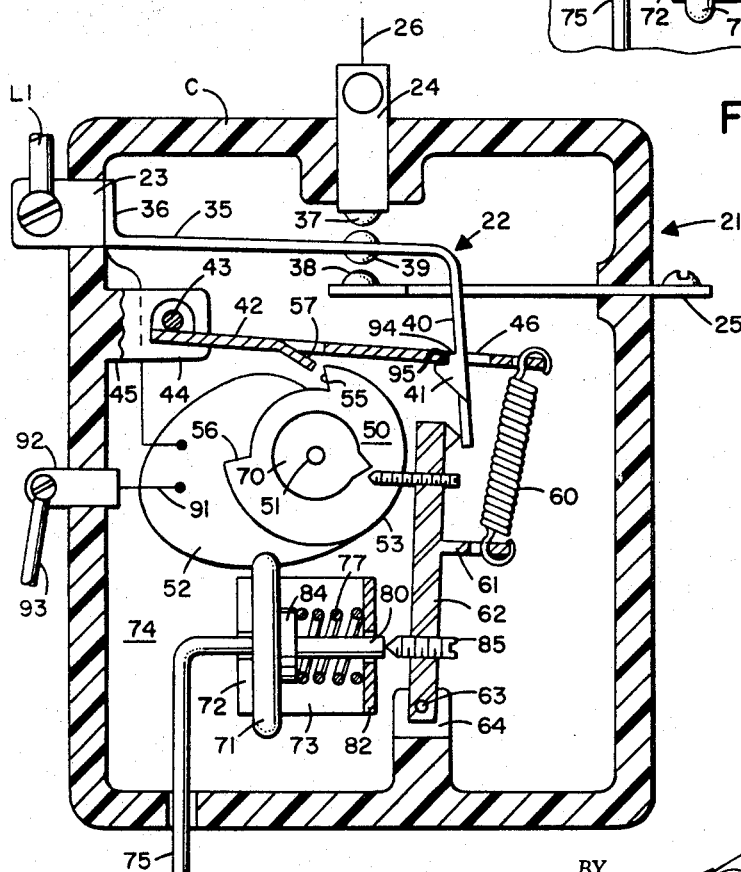

It will be seen that when the tongue 57 of operating arm 42 rides on the sector 53 of cam 50, as shown in FIG. 2, the arm is held out of engagement with the latch member 41. When the tongue 57 falls from step 55 as the cam 50 rotates, arm 42 is biased downwardly by the spring 60 and the underside thereof adjacent to the left hand end of opening 46 engages the shoulder 94 of the latch 41, and the spring 60, which has a tension such as to overcome the inherent upward spring bias of the contact arm 35, draws the contact arm downwardly to engage the contact 39 thereof with fixed contact 38 so that the compressor circuit is opened and the circuit for heater 20 is established through closing of contact 39 on contact 38. The heater 20 heats the evaporator 16 to cause the frost collected thereon to melt. When the temperature of the evaporator at bulb 76 rises to a degree at which the frost is melted and according to the adjustment of screw 85, the fluid pressure within bulb 76 causes element 71 to expand and move control lever 62 clockwise and shift the shoulder 94 of latch 41 into registration with the opening 46 through arm 42 so that the contact arm 35 is free to spring upwardly and move contact 39 from contact 38. Upward movement of the contact arm 35 is limited, however, by shoulder 95 of the latch 41 engaging the underside of the arm 42 adjacent the left hand end of opening 46, and the shoulder 95 is formed so that the contact arm 35 will be held between the fixed contacts 37, 38 and both the heater and compressor circuits are broken, as seen in FIG. 4.

Contact arm 35 will be held intermediate contacts 37, 38 by the shoulder 95 of the latch 41 engaging the underside of arm 42 until cam 67 rotates into a position in which it engages screw 66 and cams the lever 62 clockwise which shifts the portion 40 of the contact arm to the right and frees the shoulder 95 from the edge of opening 46 which releases the contact arm which then snaps upwardly and closes contact 39 on contact 37, thus re-establishing the circuit for the compressor 11. It will be understood that shoulders 94, 95 are spaced apart one-half the distance between contacts 37, 38 so that the shoulder 95 will retain the contact arm 35 intermediate the two fixed contacts.

As cam 50 continues its rotation, shoulder or step 56 will eventually engage the underside of tongue 57 and gradually raise the control lever 42 upwardly to bring the underside thereof above the level of the top shoulder 94 of the latch 41 and, because cam 67 has moved from registration with screw 66, the portion 40 of the contact arm springs to the left to bring latch shoulder 94 beneath the left hand edge of the opening 46. Thus, the parts are in position for establishing succeeding defrost cycles in the manner described hereinbefore.

It will be seen that an exceedingly simple, accurate and effective switching mechanism is provided which is actuated and controlled by both time and thermal factors to provide for termination of the compressor-motor operation, the establishment of a heating period followed by an inactive period, after which the refrigeration cycle is re-established.

It will be appreciated that should the thermally responsive element 71 fail to actuate the control lever 62, for any reason, the cam 67 will be operative to terminate the defrost cycle by moving the latch 41 to its contact arm releasing positions. Thus, a fail-safe feature is provided.

In the system shown, the delay period between the termination of the defrost cycle and the resumption of refrigeration will not be fixed but will depend upon the time required to defrost the evaporator because the timer motor drives cam 67 during the defrost cycle. A definite delay period could be provided if desired, by arranging for the timer motor to be in series circuit with the heater element 20 during the time contacts 38, 39 are separated and to cause the timer motor to be shunted when the contacts 38, 39 were closed. This could be effected by connecting wire 93 to wire 33 instead of with L2. This arrangement would cause the timer motor to operate at all times except when the defrost heater is energized.

Although but one form of the invention has been shown and described, it will be apparent that other forms, modifications and adaptations of the invention may be made all falling within the scope of the claims which follow:

I claim:

1. A control apparatus comprising, an electric switch including a switch actuating arm shiftable in opposite directions between two switching positions, means biasing said arm to one of said positions, an operating arm spaced from said switch arm and adapted to shift in the same general directions as said switch arm shifts, latch means carried by one of said arms and operative to interconnect said switch arm and said operating arm in a given spaced relationship to cause said operating arm to move said switch arm from one of said positions to the other of said positions, means to move said operating arm in a direction to overcome the bias on said switch arm to thereby move said switch arm to the other switching position when said arms are latched together, and means to actuate said latching means to release one arm from the other.

2. A control apparatus as defined in claim 1 further characterized by said latch means being operative to latch said arms together when said operating arm is moved to said given spaced relationship.

3. A control apparatus as defined in claim 2 further characterized by said latch means being operative to limit spacing of said arms to two different given spaced relationships and said actuating means for said latching means being movable to two different positions successively to actuate said latch to successively release said arms from said spaced relationships.

4. A control apparatus as defined in claim 3, further characterized by means to position said operating arm to space said switch arm intermediate said two switching positions when said latch is operative to limit said arms to the second mentioned spaced relationship.

5. A control apparatus as defined in claim 4 further characterized by spring means biasing said operating arm in a direction away from said switch arm and effective to move said operating arm to shift said switch arm from said one position to the other of said positions when said arms are latched together in the first mentioned spaced relationship and to retain said switch arm in said second spaced relationship.

6. A control apparatus as defined in claim 2 further characterized by said latch means comprising a member carried on one of said arms and having a shoulder on said member engageable with a part of the other of said arms to latch said one arm to said other arm, said means to actuate said latching means comprising means to effect relative movement between said shoulder on said member and said part of said other arm and release said shoulder and part.

7. A control apparatus as defined in claim 3 further characterized by said latch means comprising a latch member carried by one of said arms, said latch member having first and second shoulders thereon operative to successively engaged a part of said other arm when said latch member is in first and second latching positions respectively when said arms move apart, said latch member being shiftable from said first latching position to said second latching position to move said first shoulder from engagement with said part of said other arm and to position said second shoulder to be engaged by said part of said other arm as said arms move apart, said latch actuating means comprising an actuating member adapted to engage said latch member and move said latch member to release said shoulders successively from said part of said other arm during a given movement of said actuating member.

8. A control apparatus as defined in claim 7 further characterized by said actuating means including power driven cam for moving said actuating member to operate said latch member.

9. A control apparatus as defined in claim 8 further characterized by said actuating means including a thermally responsive power element to move said actuating member.

10. A control apparatus as defined in claim 1 including a frame, said switch arm comprising a spring strip supported at one end on said frame and adapted to flex in opposite directions, two spaced contacts forming stops to limit movement of said strip in said opposite directions, said strip being inherently biased towards one of said contacts, said latching means comprising a laterally extending portion of said spring strip disposed to extend adjacent to said operating arm, said portion having a latch thereon comprising two spaced step-like shoulders lying in planes generally parallel to an edge surface of said operating arm, said portion being biased towards said operating arm to urge said shoulders into registration with said edge surfaces, and means to shift said operating arm comprising a cam having a surface engaged by a part of said operating arm and a step in said surface spring means urging said operating arm to said cam surface, said means to actuate said latch means comprising an actuating member shiftable to move said portion of said spring strip from said operating arm and move said step-like shoulders from registration with said edge surfaces successively.

11. Control apparatus as defined in claim 3 further characterized by said latch actuating means comprising a thermally responsive element to actuate said latching means to release said switch arm for movement from one of said spaced relationships to said second spaced relationships.

12. Control apparatus as defined in claim 11 further characterized by said latch actuating means comprising a timer element for actuating said latch means to release said switch arm from said second spaced relationship.

13. Control apparatus as defined in claim 7 further characterized by said latch actuating means including a thermally responsive element operative to move said actuating member through a movement to effect a first release of said switch arm by said latch means.

14. Control apparatus as defined in claim 13 further characterized by said latch actuating means including a timer for shifting said actuating member through a movement to effect a second release of said switch arm by said latch means.

References Cited

UNITED STATES PATENTS

| 2,250,997 | 7/1941 | Miller | 200—136.3 |
| 2,729,718 | 1/1956 | Lieberman | 200—136.3 |
| 2,832,851 | 4/1958 | Jones | 200—153 |

BERNARD A. GILHEANY, *Primary Examiner.*

R. COHRS, *Assistant Examiner.*